UNITED STATES PATENT OFFICE.

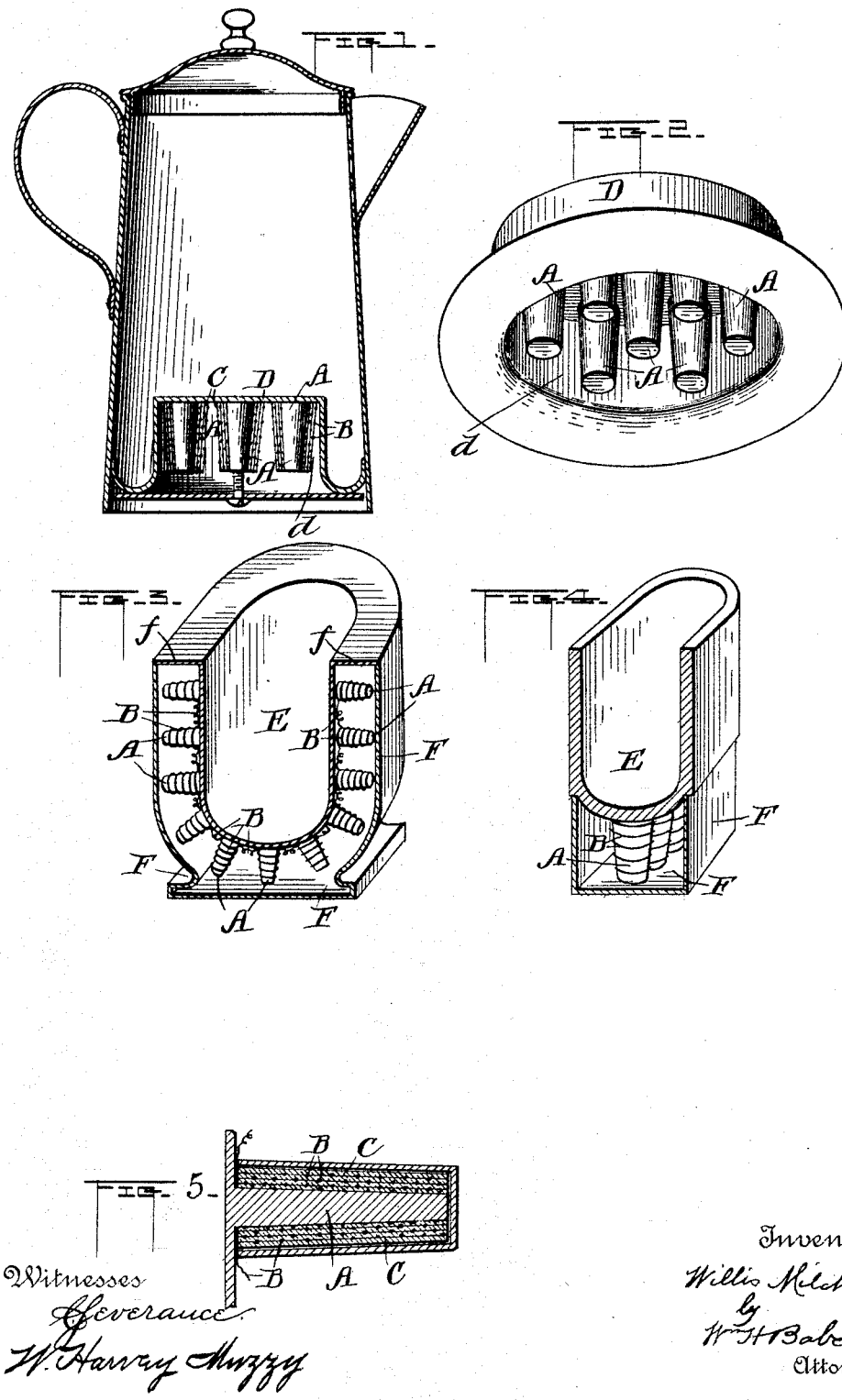
(No Model.)
W. MITCHELL.
ELECTRO MAGNETICALLY HEATED RECEPTACLE.
No. 489,318. Patented Jan. 3, 1893.

WILLIS MITCHELL, OF MALDEN, ASSIGNOR, BY MESNE ASSIGNMENTS, TO THE AMERICAN ELECTRIC HEATING COMPANY, OF BOSTON, MASSACHUSETTS.

ELECTRO-MAGNETICALLY-HEATED RECEPTACLE.

SPECIFICATION forming part of Letters Patent No. 489,318, dated January 3, 1893.

Application filed March 15, 1892. Serial No. 425,005. (No model.)

*To all whom it may concern:*

Be it known that I, WILLIS MITCHELL, a citizen of the United States, residing at Malden, in the county of Middlesex and State of Massachusetts, have invented certain new and useful Improvements in Electro-Magnetically-Heated Receptacles; and I do hereby declare the following to be a full, clear, and exact description of the invention, such as will enable others skilled in the art to which it appertains to make and use the same.

This invention has for its chief object to utilize more perfectly in electrical heaters for household and other uses the heat derived from magnetic lag or hysteresis in addition to the heat derived from resistance; the magnetism being generated in the body of a receptacle or vessel composed of magnetic metal. To this end, I provide the bottom or body of a receptacle with projecting studs or cores to which heaters including wire helices in electric circuit are applied, both the studs and the body of the vessel being of magnetic metal.

In the accompanying drawings, Figure 1 represents in vertical section a coffee pot embodying my invention; Fig. 2 represents in detail perspective the bottom part thereof and heaters, also suitable to other vessels and articles; Fig. 3 represents in perspective one half of a melting pot or glue pot, sectioned through the middle to show the studs and heating devices; Fig. 4 represents a similar view of a modified form of the same; and Fig. 5 represents on an enlarged scale a vertical longitudinal section of one of the heaters preferably used and of the stud or core to which it is applied.

A designates projecting studs of magnetic metal on a body of the same, having a wire B, which forms part of an electric circuit, wound in helices about each of them. As shown in Fig. 5, and also in my previous patent No. 457,362 and some of my other patents, the said wire is wound about successive concentric cylinders C of asbestos or other insulating material, which keep the successive concentric helices of each heater apart. The winding is at about the interval of five times the width of the wire; that is, each winding of the wire is in a space about ten times its own breadth. This is found to give results in the way of heating beyond those obtained by resistance, independent of the magnetic material used. Each stud A has therefore a tubular or hollow cylindrical heater fitted on it consisting of alternating helices of wire and cylindrical asbestos partitions with a metal cap or casing. The wire B runs from heater to heater connecting all.

Very often as shown in Fig. 1 the studs are formed only on the bottom of a receptacle or vessel, the said bottom being made concave as at $d$, to leave room for them. The plate or body D of metal on which they are formed need not include the whole article, but may, as in this instance, be merely the said bottom, the remainder of the vessel or article being of non magnetic metal. As shown in Fig. 4 the said studs are formed on the bottom of a melting pot or glue pot E which is integral and of magnetic material. The studs and heaters are hidden and protected by a supporting casing F on which the said pot rests.

Fig. 3 shows the sides as well as the bottom of the pot provided with such studs and their heaters and inclosed in a supporting casing F. A horizontal flange $f$ on the upper edge or rim of the said pot rests on the upper edge of the said casing and the pot is supported thereby. The studs at the bottom might be entirely dispensed with; and those at the sides may be used either alone or with the bottom ones on receptacles or vessels of varying shapes and for many purposes.

Whatever the shape or function of the vessel or receptacle the operation is the same. When the electric current passes through the wire B the studs A and the magnetic body to which they are attached are heated; partly by the resistance of the wire, partly by the induction between adjacent coils of the wire, partly by some not fully understood effect of the especial method of winding, but also largely by the heat due to the magnetic lag or hysteresis. This heat is communicated to the remainder of the receptacle whether that remainder is all of magnetic metal or not.

Having thus described my invention, what I claim as new and desire to secure by Letters Patent is:

1. A receptacle consisting of a hollow body of magnetic material having studs of similar material formed thereon, in combination with wire helices which are in electric circuit and magnetize the said studs and body for the purpose set forth.

2. In a receptacle or article, a hollow body of magnetic material having studs of the same material, in combination with electric heaters fitted on the said studs, each heater consisting of a series of continuous wire helices and alternating cylindrical partitions substantially as set forth.

3. A hollow receptacle having its bottom formed of a plate or body of magnetic metal provided with studs of the same, in combination with a wire wound about the said studs and forming part of an electric circuit, the said wire serving to magnetize the said studs and body or plate and thereby heat the same beyond the heat due to resistance, substantially as set forth.

4. A hollow receptacle having its bottom composed of magnetic metal, concave and provided with studs of the same material, in combination with electrical heaters which include wire helices and are fitted on the said studs for the purpose set forth.

5. A receptacle consisting of a hollow shell of magnetic material provided with cores in combination with an electric conductor applied thereto so as to magnetize the said cores and an exterior shell or casing substantially as set forth.

6. A receptacle consisting of a hollow body provided with magnetic cores or studs in combination with an electric conductor applied to the said cores or studs to magnetize the same for the purpose set forth.

In testimony whereof I affix my signature in presence of two witnesses.

WILLIS MITCHELL.

Witnesses:
PELATIAH R. TRIPP,
EDWIN W. PIERCE.